(12) United States Patent
Zendehroud et al.

(10) Patent No.: US 8,177,464 B2
(45) Date of Patent: May 15, 2012

(54) CONNECTOR COMPONENT WITH TEMPERATURE-RESISTANT SENSOR ELEMENT

(75) Inventors: Jafar Zendehroud, Kassel (DE); Gert Hoering, Karlsruhe (DE)

(73) Assignee: AMG Intellifast GmbH, Speyer (DE)

( * ) Notice: Subject to any disclaimer, the term of this patent is extended or adjusted under 35 U.S.C. 154(b) by 515 days.

(21) Appl. No.: 12/298,681

(22) PCT Filed: Apr. 27, 2007

(86) PCT No.: PCT/EP2007/003739
§ 371 (c)(1),
(2), (4) Date: Feb. 2, 2009

(87) PCT Pub. No.: WO2007/124924
PCT Pub. Date: Nov. 8, 2007

(65) Prior Publication Data
US 2009/0183572 A1    Jul. 23, 2009

(30) Foreign Application Priority Data
Apr. 27, 2006 (DE) ............... 20 2006 006 990 U

(51) Int. Cl.
F16B 31/02 (2006.01)
(52) U.S. Cl. ............................................. 411/8; 73/761
(58) Field of Classification Search ............. 411/8, 14; 73/761
See application file for complete search history.

(56) References Cited

U.S. PATENT DOCUMENTS

| | | | | | |
|---|---|---|---|---|---|
| 4,205,117 | A | * | 5/1980 | Nishiyama et al. | 428/432 |
| 4,214,018 | A | * | 7/1980 | Halon et al. | 427/100 |
| 4,846,001 | A | * | 7/1989 | Kibblewhite | 73/761 |
| 4,899,591 | A | * | 2/1990 | Kibblewhite | 73/761 |
| 5,029,480 | A | * | 7/1991 | Kibblewhite | 73/761 |
| 5,131,276 | A | * | 7/1992 | Kibblewhite | 73/761 |
| 5,205,176 | A | * | 4/1993 | Kibblewhite | 73/761 |
| 5,437,525 | A | * | 8/1995 | Bras | 411/14 |
| 5,461,923 | A | * | 10/1995 | Meisterling | 73/761 |

FOREIGN PATENT DOCUMENTS

| | | |
|---|---|---|
| DE | 42 24 035 A1 | 1/1994 |
| DE | 42 32 254 A1 | 4/1994 |
| DE | 10 2004 038 638 B3 | 6/2006 |
| WO | WO 92/03665 A1 | 3/1992 |
| WO | WO 2006/015813 A1 | 2/2006 |

* cited by examiner

*Primary Examiner* — Gary Estremsky
(74) *Attorney, Agent, or Firm* — Muncy, Geissler, Olds & Lowe, PLLC

(57) ABSTRACT

The invention relates to a connector component (1) with integrated ultrasonic sensor (5). The ultrasonic sensor (5) is used to determine the prestressing force or the stressing force of the connector component (1), wherein the ultrasonic sensor (5) has a layer construction (20) having an electrode layer (21), at least one mechanical protection layer (22) and at least one layer (23) composed of a material having piezoelectric properties. The at least one electrode layer (21), the at least one mechanical protection layer (22) and the at least one layer (23) composed of a material having piezoelectric properties are arranged in a manner applied by sputtering at a freely accessible end (25, 27) of the connector component (1).

18 Claims, 3 Drawing Sheets

CONNECTOR COMPONENT WITH TEMPERATURE-RESISTANT SENSOR ELEMENT

This application is a national stage of International Application No.: PCT/EP2007/003739, which was filed on Apr. 27, 2007, and which claims priority to German Patent Application No.: 20 2006 006 990.9, which was filed in Germany on Apr. 27, 2006, and which are both herein incorporated by reference.

TECHNICAL FIELD

The prestressing force or stressing force of mechanical connector components such as screws or bolts, for example, is checked by means of ultrasonic measurement methods. This is done by measuring the signal propagation time of ultrasound waves which are coupled into the respective connector component at one or more separate, frequently predefined, operating frequencies. In the course of progress in material sciences, a large number of composite and graded materials and also special alloys have been introduced in recent years, from which connector components such as bolts or screws can be manufactured, the material properties of which impose more stringent demands on a measurement method for determining the prestressing force.

PRIOR ART

DE 42 24 035 A1 and DE 42 32 254 A1 disclose ultrasonic test methods. In accordance with these methods, a frequency-modulated chirp signal x(t) is provided for driving an ultrasonic transducer arranged in a transmission path, the instantaneous frequency f of said chirp signal being modulated nonlinearly with time t. The temporal profile f(t) of the instantaneous frequency of the frequency-modulated chirp signal x(t) with respect to a transfer function H(f) is matched to the predetermined transmission path. The temporal change in the instantaneous frequency f of the frequency-modulated chirp signal x(t) is correlated with the value of the transfer function H(f) of the transmission path associated with this frequency f, in such a way that, at frequencies f with a low associated value of the transfer function H(f), the rate of frequency change is less than at frequencies f with a high associated value of the transfer function H(f).

A square-wave chirp signal x'(t) is used for driving the ultrasonic transducer. Furthermore, a device for ultrasonic testing with a signal generator for driving an ultrasonic transducer with a frequency-modulated chirp signal x(t) is proposed, the instantaneous frequency f of said signal being nonlinearly dependent on time, and also proposed is a pulse compression filter for converting the chirp signal y(t) received by this or some other ultrasonic transducer into a short received pulse z(t).

DE 10 2004 038 638 discloses a method for determining the prestressing force of connector components by ultrasonic excitation. This method involves measuring the stressing force of connector components, e.g. screws or bolts, by broadband ultrasonic excitation. This is done by using a pulse generator that generates an ultrasonic pulse by means of statistically distributed phase angle of used and/or resolvable frequency components with a predeterminable pulse width. The pulse width is matched to spacings of ultrasonic pulse echoes in such a way that no overlapping of individual different reflections occurs and the maximum possible pulse duration is achieved. The received ultrasonic pulse echo is temporally selected with regard to at least one reflection and subjected to a transformation method, in such a way that, for a defined point in time related to the ultrasound, all the frequency contributions are shifted temporally or in terms of phase.

DE 10 2004 038 638 additionally discloses a connector component whose head region has situated therein an ultrasonic transducer, the construction of which is embodied as a layer construction.

Nowadays e.g. adhesively bonded sensors with PVDF films are used as ultrasonic transducers, also referred to as ultrasonic sensors. The ultrasonic sensors embodied with PVDF films are highly sensitive and are applied e.g. to screw heads of connector components embodied as screws. The application and fixing to a screw head is generally effected by means of an adhesive layer. PVDF films have the disadvantage that they are not temperature-resistant. Starting from a temperature of approximately 70° C., an aging process occurs in the PVDF film and in the extreme case can lead to the dissolution of the PVDF film. The basic problem in the case of PVDF films is the dissolution of the film as seen over the operational period, or a partial detachment of the film material. If the prestressing force or the stressing force of a connector component embodied in screw form is then measured with the aid of an ultrasonic sensor produced from PVDF film, then the partial detachments that occur, for example, owing to high temperature loading below the PVDF film are not visible. Owing to the partial detachments and the unknown local position of the partial detachments, an incorrect measurement result is obtained during an ultrasonic measurement using such a predamaged ultra-sonic sensor, since the signal propagation times are corrupted owing to the ultrasonic signal path that is lengthened by the partial detachments. With complete dissolution of the PVDF film, an ultrasonic measurement is no longer possible at all in the extreme case. The corruption occurring can lead to errors of up to 40%, by which a result based on a propagation time measurement of an ultrasonic signal can be considerably corrupted, if not even made unusable.

Furthermore, the use of a coupling gel is known in the case of ultrasonic measurements, but this is unsuitable for determining a prestressing force in a screw-type connector component since tiny differences in the positioning of the test head give rise to ultrasonic coupling lead time differences which are larger than the measurement quantity itself. In general, the required accuracy classes cannot be achieved with ultrasonic measurements in which a coupling gel is used.

SUMMARY OF THE INVENTION

In view of the outlined disadvantages of the solutions in the prior art, the invention is based on the object of providing a connector component with integrated ultrasonic sensor which, in particular, can be used at higher temperatures of >350° C. and remains resistant over a long operational period. In addition, the ultrasonic sensor is intended to be embodied such that it is resistant to oxidation.

The invention proposes a connector component which is embodied in screw-type fashion, in particular, and which comprises at a freely accessible end an ultra-sonic sensor having a layer construction. The ultra-sonic sensor constitutes part of the connector component embodied in screw-type fashion and is assigned in particular on an end face at the screw head and the freely accessible screw end opposite thereto, i.e. an end side of the connector component after the thread run-out. Both the end side representing the screw head and the screw end opposite thereto constitute a freely accessible location at which an ultrasonic signal can be coupled into the connector component.

The ultrasonic sensor preferably comprises at least one electrode layer, wherein individual electrodes are insulated from one another. Furthermore, the layer construction of the proposed connector component with integrated ultrasonic sensor comprises a mechanical protection layer and also a layer composed of a material having piezoelectric properties. The aforementioned at least three layers of the layer construction of the ultrasonic sensor are applied at the freely accessible end of the connector component, preferably embodied in screw-type fashion, using sputtering technology. In the course of sputtering, by the application of an electric field at a sputtering device, sputtering of extremely small particles of the respective material is achieved, whereby the individual layers of the ultrasonic sensor embodied as a layer construction are applied to the respective freely accessible end side of the connector component, in the present case e.g. to the end side of the screw head or to the end side opposite thereto at the end of the thread run-out, whilst achieving a high adhesion of more than 40 newtons per $mm^2$. All coupling faults between the ultrasonic sensor element and the respective end side of the connector component are eliminated on account of the high adhesion. In comparison with adhesive bonding, the adhesion achieved is high-temperature-resistant.

The connector component is preferably produced from customary screw materials such as e.g. high-alloy steels, special steels, titanium and its alloys, thus e.g. TiAl6V4, aluminum and its alloys, brass, Inconel (nickel alloy) and nonmagnetic steels such as e.g. A286 steel.

The layer construction of the ultrasonic sensor embodied in at least three layers has, implemented using thin-film technology, individual layers applied on one of the respective freely accessible end sides, wherein the material having piezoelectric properties is sputtered onto the respective freely accessible end side of the connector component.

The connector components with integrated ultrasonic sensor which are proposed according to the invention are distinguished by a high temperature resistance over a long operational period. They are suitable for use e.g. on aircraft engines having extremely high temperatures, in particular in the vicinity of the combustion chamber, wherein heating of the connector component to a temperature level of between 350° C. and 400° C. is achieved. At an assumed temperature within the combustion chamber of 2000° C., connector components, such as e.g. screws or bolts, mounted outside the combustion chamber on an aircraft engine are exposed to temperatures of more than 500° C.

Besides applications in the area of aircraft engines, the connector components with integrated ultrasonic sensor which are proposed according to the invention can also be used in power stations, i.e. in nuclear power stations. In general, connector components used in power stations, apart from annual inspections, are exposed to a uniform temperature loading, while connector components used in aircraft construction, and in particular in engine construction, are exposed to a cyclic loading. The cycles are thus of a temporal duration of 2 up to a number of hours e.g. during short, medium and long haul flights.

The ultrasonic sensor which is integrated on the connector component and is proposed according to the invention comprises a material having piezoelectric properties within its layer construction. The piezoelectric effect is used by applying a voltage to said material having piezoelectric properties in that the spatial expansion of said material is utilized. The voltage applied is preferably an alternating voltage, such that the latter brings about a periodic expansion and contraction of the material having piezoelectric properties, i.e. an oscillation. Since the ultrasonic sensor is fixedly connected to the connector component, the oscillations are coupled as waves, owing to the frequency used in the megahertz range as ultrasound waves, into the connector component preferably embodied as a screw. The ultrasonic sensor which is integrated in the connector component and is proposed according to the invention is furthermore distinguished by an extremely broadband operating frequency range. A further crucial advantage is that the ultrasonic sensor can simultaneously generate longitudinal and transverse ultrasound waves in the connector component, which is of crucial importance with regard to a signal consistency of the signal obtained.

This piezoelectric effect disappears after the Curie temperature has been reached; accordingly, an ultrasonic measurement is not possible above the Curie temperature, which is dependent on the material having piezoelectric properties that is used. An ultrasonic measurement can be performed again only when the temperature of the connector component falls below the Curie temperature of the material having piezoelectric properties that is respectively used.

The connector component with integrated ultrasonic sensor that is proposed according to the invention firstly avoids the phenomenon of the dissolution or partial detachment of PVDF ultrasonic sensors, with the result that a reliable ultrasonic measurement is possible. After undergoing a multiplicity of the temperature cycles described above, the connector component with integrated ultrasonic sensor that is proposed according to the invention is also both functional and able to supply reliable measurement results as soon as the component temperature lies below the Curie temperature of the material having piezoelectric properties that is respectively used.

The ultrasonic sensor which is integrated on the connector component and is proposed according to the invention is on the one hand of extremely compact construction and on the other hand has an enormous heat resistance which is still present to a high extent even after a plurality of operating cycles, e.g. on an aircraft engine, with the result that reliable signals can be obtained; furthermore, the ultrasonic sensor which is integrated on the connector component and is proposed according to the invention is distinguished by a long lifetime, which is fostered by the material selection.

DRAWING

The invention is described in greater detail below with reference to the drawing.

EMBODIMENT VARIANTS

Figure 1:
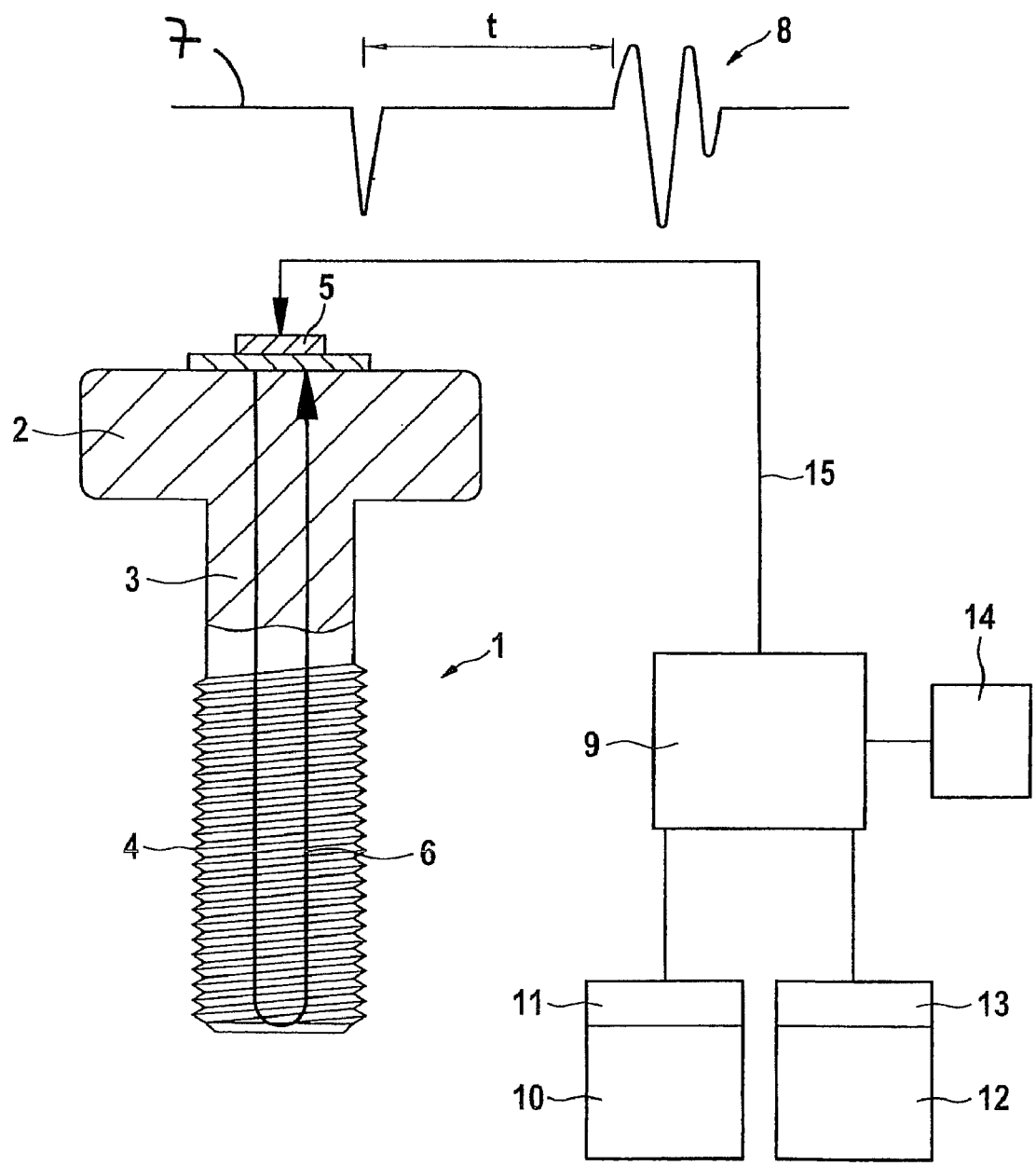
FIG. 1 shows a device for carrying out an ultrasonic measurement on a connector component embodied as a screw.

In the illustration in accordance with FIG. 1, a connector component 1 is embodiment as a screw. In addition, the connector component can also be embodied as a pin or bolt.

The connector component 1 illustrated in FIG. 1 comprises a screw head 2 and a shaft 3. Extending below the shaft 3 is a threaded part 4, which can be screwed into a mutually complementary thread of a component or be provided with a screw nut. Situated above the screw head 2 is an ultrasonic sensor 5 for an ultrasonic pulse 7 to be coupled into the connector component 1. The ultrasonic pulse 7 coupled into the connector component 1 at the ultrasonic sensor 5 rung along a propagation path 6 through the connector component 1 and emerges again from the connector component 1 as an electrical ultrasonic pulse echo 8 at the ultrasonic sensor 5 for the ultrasonic pulse 7. t denotes the time that elapses between the entry of the ultrasonic pulse 7 into the connector component 1 and the emergence of the ultrasonic pulse echo 8 from the connector component 1, i.e. the propagation time of the ultra-sonic signal.

When coupling the ultrasonic pulse 7 into and for coupling the electrical ultrasonic echo 8 out of the connector component 1, a signal transmission line 15, which can be constituted as a coaxial cable, extends with an impedance inherent to the signal transmission line 15 between the ultrasonic sensor 5 and an ultrasonic measuring device 9. The ultrasonic measuring device 9 is connected to a computer 14, which can be a PC for example. Furthermore, the ultrasonic measuring device 9 is connected to a pulse generator 10 (arbitrary function generator), to which a first power amplifier 11 can be assigned. The pulse generator 10 with first power amplifier 11 generates the ultrasonic pulses 7 with interposition of the ultrasonic sensor 5. A transient recorder 12, which can comprise a power amplifier 13, serves for signal detection of electrical ultrasonic pulse echoes 8 coupled out from the connector component 1. In order to determine the propagation time in the signal transmission line 15 that is present at the time of measuring the stressing force and the propagation times of the ultrasonic signals through the electronic measuring device 9, the reflection of an electrical excitation signal at the end (at the ultrasonic sensor 5) of the signal transmission line 15 is used.

Figure 2:
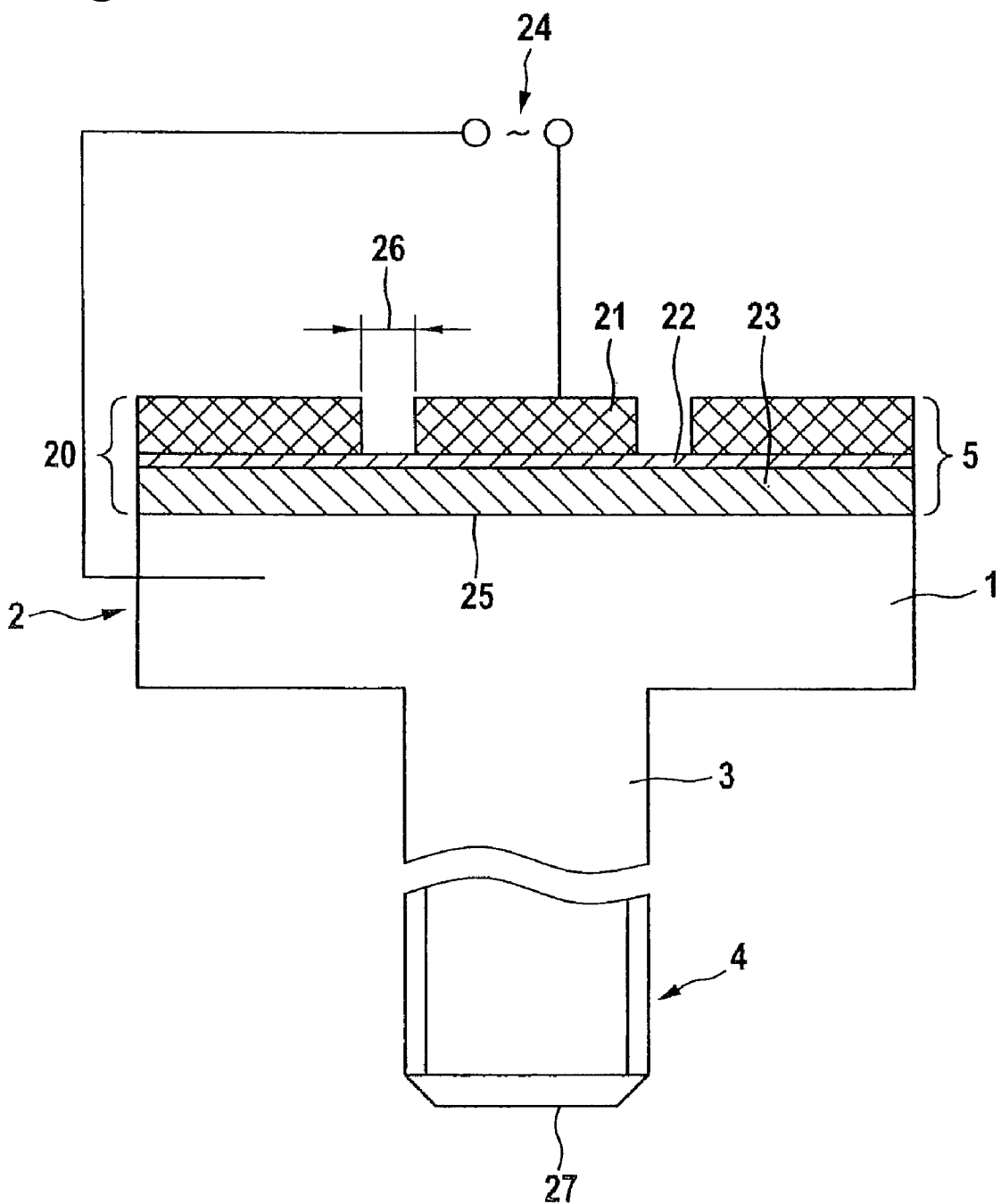
FIG. 2 shows a section—illustrated on an enlarged scale—through the layer construction of the ultrasonic sensor integrated on the connector component.

The illustration in accordance with FIG. 2 reveals the connector component without evaluation peripherals, but with an integrated ultrasonic sensor element, on an enlarged scale.

The connector component 1 illustrated in FIG. 2 is preferably embodied as a screw. In addition, the connector component 1 can also be embodied as a bolt pin or rivet or the like. The connector component 1 comprises the shaft 3, on which the threaded part 4 is formed. The ultrasonic sensor 5 having a layer construction 20 is situated on a first end 25, which is the end side of the screw head 2. The layer construction 20 comprises at least three layers, wherein a layer 23 composed of a material having piezoelectric properties is sputtered directly onto the first end 25, i.e. the end side of the screw head 2. The layer 23 is sputtered on with a layer thickness of a few μm. A mechanical protection layer 22 is sputtered onto the layer 23, the layer thickness of said mechanical protection layer being smaller than the layer of the underlying layer 23 composed of a material having piezoelectric properties. Finally, the layer construction 20 in accordance with the illustration in FIG. 2 comprises at least one electrode layer 21. Within the electrode layer 21, individual electrodes are insulated from one another, indicated by a distance 26.

The ultrasonic sensor 5 illustrated in FIG. 2 as the layer construction 20 can also be sputtered on at a second end 27, which is likewise freely accessible.

What is illustrated in FIG. 2 in an exemplary manner using the example of a connector component 1 embodied as a screw can also be implemented on a connector component 1 which can be embodied as a bolt, as a rivet or as a pin.

The ultrasonic sensor 5 in layer construction 20 that is integrated in the connector component 1 and is proposed according to the invention is distinguished by a high adhesion e.g. at the first end 25—embodied as an end side—of the connector component 1. All coupling faults which can adversely affect the signal propagation time between the ultrasonic sensor 5 and the connector component 1—in particular an adhesive layer between the layer 23 and the first end 25—are eliminated on account of the high adhesion of more than 40 newtons per mm$^2$. As a result, it is possible to achieve a considerably more accurate signal propagation time measurement and thus a significantly more accurate determination of the prestressing force or the stressing force of the connector component 1. The connector component 1 can be produced from the group of the materials presented below: high-alloy steels, special steels, titanium and its alloys, in particular TiAl6V4, and aluminum and its alloys, furthermore brass, Inconel (nickel alloy) and steels, such as e.g. A286, which are nonmagnetic.

The ultrasonic sensor 5 proposed according to the invention is fully functional even after undergoing a multiplicity of temperature cycles characterized by a short temperature increase time of a few minutes, a lengthy temperature loading at an increased temperature level of between 350° C. and 500° C., in the extreme case up to 1000° C. and cooling that takes place only slowly; partial detachments that can adversely affect the signal propagation time of an ultrasonic signal do not occur within the layer construction 20.

Since each layer within the layer construction 20, i.e. the at least one electrode layer 21, the at least one mechanical protection layer 22 and the at least one piezoelectric layer 23, is applied by way of sputtering technology, between the individual layers 21, 22, 23 of the layer construction 20 in each case high adhesion forces prevail not only between the contact side of the layer 23 composed of a material having piezoelectric properties and the first end 25 of the connector component 1, but also among the layers 21, 22, 23. Individual electrodes within the electrode layer 21 are insulated preferably by means of a masking technique that produces the distances 26—illustrated in FIG. 2—between the individual electrodes of the electrode layer 21.

Depending on the chosen material from which the layer 23 is produced and which has piezoelectric properties, a reliable ultrasonic signal can be generated after the undershooting of the respective Curie temperature of the material having piezoelectric properties from which the layer 23 is produced, which permits a meaningful ultrasonic measurement.

Preferably, the thickness of the layer 23 composed of the material having piezoelectric properties exceeds the thickness of the mechanical protection layer 22 by a multiple, while the layer thickness in which the electrode layer 21 is embodied can essentially correspond to the thickness of the layer 23 composed of a material having piezoelectric properties.

In accordance with a further advantageous embodiment, the sensor element proposed according to the invention is accommodated in a cutout or depression on a first end side of the connector component.

Figure 3:
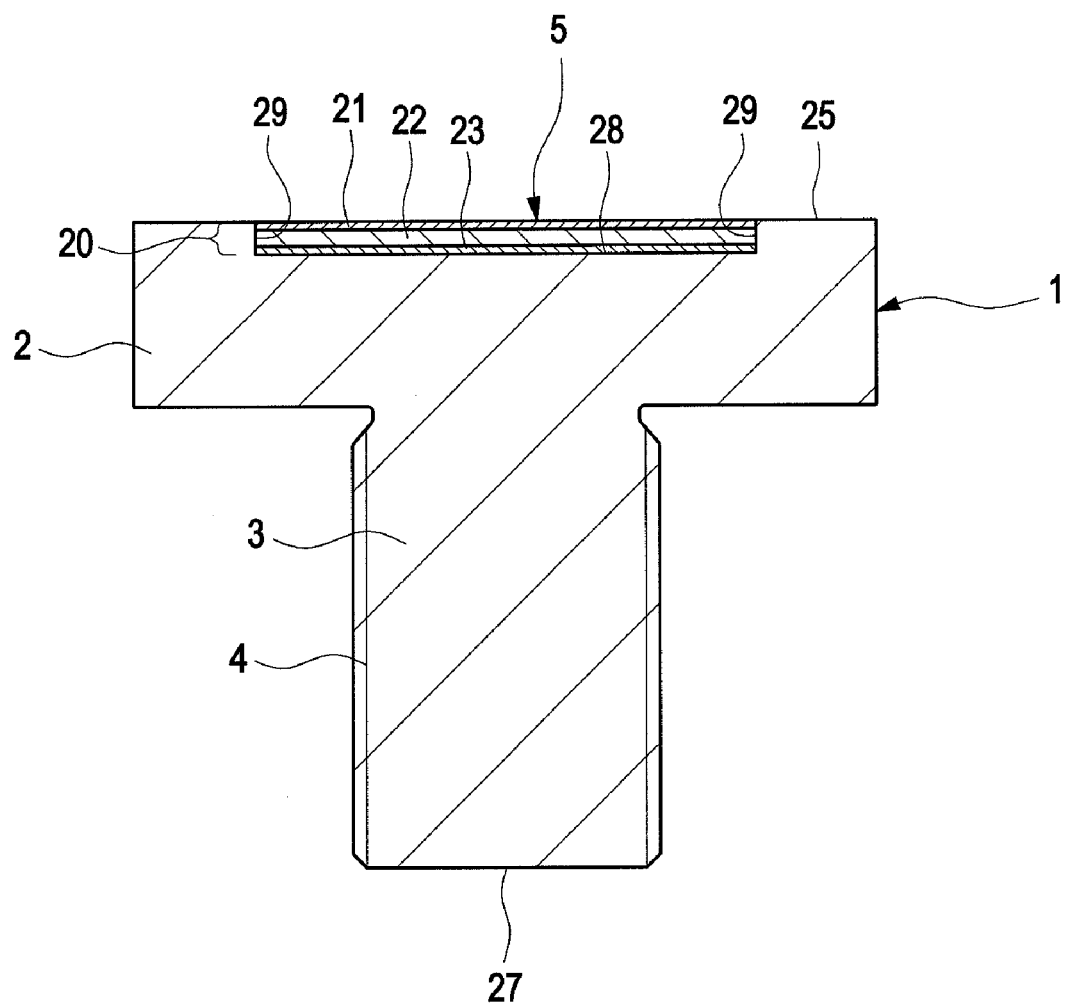
FIG. 3 shows a further embodiment of an ultra-sonic sensor constructed in layers, embedded in to the connector component.

FIG. 3 reveals that the connector component 1 constituted as a screw in the embodiment in accordance with FIG. 3, analogously to the embodiment illustrated in FIG. 2, includes the screw head 2, the shaft 3, the threaded part 4 and the ultrasonic sensor 5. The ultrasonic sensor 5 in accordance with the illustration in FIG. 3 is formed in the layer construction 20 and comprises the electrode layer 21, the mechanical protection layer, cf. reference symbol 22, and also the piezoelectric layer 23. The layer construction 20 of the ultrasonic sensor 5 is incorporated in a cutout or depression 28 at the first end 25 of the connector component 1. The cutout or depression 28 at the first end 25 of the connector component 1 furthermore comprises a lateral boundary wall 29. The lateral boundary wall 29 advantageously has the effect that the layer construction 20 of the ultrasonic sensor 5 by the material of the connector component 1, which is a high-grade steel material or a high-alloy steel, covers the side areas of the layer construction 20, i.e. of the electrode layer 21, of the mechanical protection layer 22 and of the piezoelectric layer 23. As a result, the diffusion of hydrogen molecules in particular into the piezoelectric layer 23, oxidation and deoxidation of the piezoelectric layer 23, and contamination by foreign substances into the piezoelectric layer 23 can be effectively prevented. In the event of foreign molecules diffusing through hollow channels into the piezoelectric layer 23, this would result there in a reduction of the electrical resistance of the piezoelectric layer 23 and, at higher temperatures, in a chemical conversion of the piezoelectric layer 23, which in the longer term leads to the total failure of the ultrasonic sensor 5.

The compactly formed protection layer 22 prevents the diffusion of foreign molecules into the piezoelectric layer 23 and also the oxidation and deoxidation of the piezoelectric layer 23. A lateral protection of the layer construction 20 of the ultrasonic sensor 5 against oxidation and deoxidation and also against indiffusion of hydrogen molecules is effected by the embedding of said sensor into the cutout or depression 28 at the first end 25 of the connector component 1.

As revealed in the illustration in accordance with FIG. 3, the layer construction 20 of the ultrasonic sensor 5 is incorporated into the cutout or depression 28 at the first end 25 into the end side of the connector component 1. The ultrasonic sensor 5 constructed in the layer construction 20 in the embodiment in accordance with FIG. 3 is used at temperatures of at least 200° C., preferably at temperatures of between 250° C. and 950° C. The piezoelectric layer 23 is produced from a material such as ZnO, for example. The piezoelectric effect ceases as of when the Curie temperature is exceeded.

The piezoelectric layer 23 is to be protected against oxidation and deoxidation. Aluminum nitride or silicon oxide or barium titanate can also be used for the material from which the piezoelectric layer 23 within the layer construction 20 is produced. The material from which the connector component 1 is produced can be special steels, in particular non-oxidized special steels and also high-alloy steels such as TiAl6V4.

The mechanical protection layer 22 arranged within the layer construction 20 is preferably produced in combination with N, C or O, wherein the combining material is preferably a metallic material. The mechanical protection layer 22 can be produced from carbides, nitrides, oxides, in each case in combination with titanium, zirconium, silicon, aluminum or chromium.

The following materials can be chosen in the case of the electrode layer 21: in a first embodiment, it is possible to use metals with or without nitrogen, for example titanium and TiN or the like and chromium and CrN, or in a further embodiment to use them as a metal alloy, thus for example NiCr. In the choice of the material from which the electrode layer 21 of the layer construction 20 of the ultrasonic sensor 5 is produced, use is preferably made of elements of groups IV, IVb, VIb, VIIIb, Ib, thus for example Sn, Ag, Ti or other metallic compounds among one another, thus for example NiCr.

In the case of the layer construction 20 as which the ultrasonic sensor 5 proposed according to the invention is embodied, care must be taken to ensure that the layer construction 20 is embodied compactly and in a manner free of pores.

The connector component 1 is a screw having the ultrasonic sensor 5 proposed according to the invention incorporated in its screw head 2. The connector component 1 comprises a screw head 2, the shaft 3 and also the threaded part 4 formed on the circumference thereof. While the first end of the connector component 1 is designated by reference symbol 25, the second end opposite thereto is designated by reference symbol 27.

The ultrasonic sensor 5 illustrated in accordance with FIG. 3 can be used as a high-temperature sensor. The ultrasonic sensor proposed according to the invention is used as a high-temperature sensor in a temperature range of between 200° C. and 1000° C., preferably in a temperature range of between 250° C. and 950° C., and particularly preferably within a temperature range of between 650° C. and 900° C. In the embodiment illustrated, the piezoelectric layer 23 is produced from ZnO, for example, while the material from which the connector component 1—here illustrated as a screw—is produced is preferably special steels, non-oxidized special steels and high-alloy steels which are high-temperature-resistant.

Besides the ZnO already mentioned, the piezoelectric layer 21 can also be produced from aluminum nitride, silicon oxide or barium titanate. In the case of the mechanical protection layer 22, metallic compounds comprising N or O are preferably used in order to protect the piezoelectric layer 23. The mechanical protection layer 22 is arranged below the electrode layer 21 but above the piezoelectric layer 23. In order to prevent the penetration of foreign molecules, e.g. hydrogen, into the piezoelectric layer 23 and the oxidation and deoxidation of the piezoelectric layer 23, the individual layers 21, 22, 23 of the layer construction 20 of the ultrasonic sensor 5 are incorporated into the cutout or depression 28 in the screw head 2 of the connector component 1. The cutout 28 also protects the piezoelectric layer 23 of the layer construction 20 against indiffusing foreign molecules and against oxidation and deoxidation.

In order to prevent the indiffusion of $H_2$ or water molecules into the interior of the piezoelectric layer 23, care must be taken to ensure that the electrode layer 21 and also the protection layer 22 of the ultrasonic sensor 5 are embodied compactly and in a manner free of pores and, in particular, do not form any cavities within which the $H_2$ or water molecules could be taken up or diffused. This is necessary for the water or moisture resistance of the ultrasonic sensor 5.

LIST OF REFERENCE SYMBOLS

1 Connector component
2 Screw head
3 Shaft
4 Threaded part
5 Ultrasonic sensor
6 Sound path
7 Propagation time of ultrasonic signal between coupling into and out of connector component 1
8 Ultrasonic pulse echo
9 Electronic ultrasonic measuring device
10 Pulse generator
11 Power amplifier
12 Transient recorder
13 Preamplifier
14 Computer
15 Signal transmission line
20 Layer construction of ultrasonic sensor 5
21 Electrode layer
22 Mechanical protection layer
23 Piezoelectric layer
24 Connection for alternating voltage
25 First end (end side of screw head 2)
26 Distance between individual electrodes
27 Second end (thread run-out of connector component)

28 Cutout, Depression
29 Lateral boundary wall

The invention claimed is:

1. A connector component with an integrated ultrasonic sensor for determining a prestressing force or a stressing force of the connector component, wherein the ultrasonic sensor comprises a layer construction having an electrode layer, at least one mechanical protection layer and at least one layer composed of a material having piezoelectric properties, and the at least one electrode layer, the at least one mechanical protection layer and the at least one layer composed of a material having piezoelectric properties are arranged in a manner applied by sputtering at a freely accessible end of the connector component, wherein the layer construction is embodied compactly and in a manner free of pores, and the ultrasonic sensor is adapted to withstand multiple thermo cycles, wherein the at least one mechanical protection layer separates the layer composed of a material having piezoelectric properties from the electrode layer, and wherein the layer thickness of the mechanical protection layer is at most half the layer thickness of the layer composed of the material having piezoelectric properties.

2. The connector component as claimed in claim 1, wherein the connector component is constructed as a high-temperature sensor to withstand a temperature range of between 200° C. and 1000° C.

3. The connector component as claimed in claim 1, wherein the connector component is produced from a member of the group consisting of: high-alloy steels, special steels, titanium and alloys thereof, TiAl6V4, aluminum and alloys thereof, nickel alloys, Inconel, nonmagnetic steels, or brass.

4. The connector component as claimed in claim 1, wherein the layers of the layer construction are applied an adhesion force between 20 N/mm$^2$ and 80 N/mm$^2$ in relation to one another.

5. The connector component as claimed in claim 1, wherein the layer composed of a material having piezoelectric properties is applied with an adhesion force of more than 40 newtons per mm$^2$ to a first end or a second end of the connector component.

6. The connector component as claimed in claim 1, wherein the ultrasonic sensor is adapted to withstand temperatures above the Curie temperature of the material having piezoelectric properties and is adapted to supply meaningful ultrasonic pulse echoes for temperatures below the Curie temperature of the material having piezoelectric properties in a layer.

7. The connector component as claimed in claim 1, wherein the layer thickness of the electrode layer is <30 μm.

8. The connector component as claimed in claim 1, wherein the layer thickness of the mechanical protection layer is <20 μm.

9. The connector component as claimed in claim 1, wherein the layer thickness of the layer composed of a material having piezoelectric properties is <50 μm.

10. The connector component as claimed in claim 1, wherein the first end is the end side of a screw head.

11. The connector component as claimed in claim 1, wherein the second end is the end side at the end of a threaded part.

12. The connector component as claimed in claim 1, embodied as an element of the group consisting of a screw, a hollow screw, a stay bolt, a bolt, a rivet a pin or a special component for aeronautics applications.

13. The connector component as claimed in claim 1, wherein the integrated ultrasonic sensor, at the freely accessible first end of the connector component, is incorporated into a cutout or depression formed there.

14. The connector component as claimed in claim 13, wherein the layer construction of the ultrasonic sensor is embedded into the first end or the second end of the connector component.

15. The connector component as claimed in claim 4, wherein the layers are applied an adhesion force of 50 N/mm$^2$.

16. The connector component as claimed in claim 4, wherein the layers are applied an adhesion force of 40 N/mm$^2$.

17. The connector component as claimed in claim 1, wherein the ultrasonic sensor, after multiply undergoing a thermal cycle with a short heating period in which an increased temperature level prevails, and after undergoing a cooling period, supplies an ultrasonic pulse echo capable of providing an accurate ultrasonic measurement at the cooled connector component.

18. The connector component as claimed in claim 1, wherein the at least one mechanical protection layer is sandwiched between the layer composed of a material having piezoelectric properties and the electrode layer.

* * * * *